(12) United States Patent
LeComte

(10) Patent No.: US 7,764,791 B2
(45) Date of Patent: Jul. 27, 2010

(54) METHOD FOR SECURED TRANSMISSION OF AUDIOVISUAL FILES

(76) Inventor: Daniel LeComte, 157, rue de la Pompe, F-75116 Paris (FR)

(*) Notice: Subject to any disclaimer, the term of this patent is extended or adjusted under 35 U.S.C. 154(b) by 1492 days.

(21) Appl. No.: 11/093,671

(22) Filed: Mar. 30, 2005

(65) Prior Publication Data

US 2005/0193019 A1   Sep. 1, 2005

Related U.S. Application Data

(63) Continuation of application No. PCT/FR03/02916, filed on Oct. 3, 2003.

(30) Foreign Application Priority Data

Oct. 3, 2002 (FR) .................................. 02 12268

(51) Int. Cl.
*H04N 7/167* (2006.01)
(52) U.S. Cl. ............................................. 380/210
(58) Field of Classification Search ................. 380/203, 380/204, 210, 214, 217, 223; 713/169, 176
See application file for complete search history.

(56) References Cited

U.S. PATENT DOCUMENTS

| 5,953,506 A * | 9/1999 | Kalra et al. ............ 709/231 |
| 7,319,756 B2 * | 1/2008 | Oomen et al. ............ 380/236 |
| 7,382,969 B2 * | 6/2008 | Dawson ............ 386/94 |
| 2002/0166048 A1 * | 11/2002 | Coulier ............ 713/169 |

FOREIGN PATENT DOCUMENTS

| EP | 0 492 692 A2 | 7/1992 |
| WO | WO 01/97520 A2 | 12/2001 |

* cited by examiner

*Primary Examiner*—Beemnet W Dada
(74) *Attorney, Agent, or Firm*—Connolly Bove Lodge & Hutz LLP

(57) ABSTRACT

A procedure for distributing audiovisual sequences according to a nominal format of a stream including a succession of frames including before transmission to destination equipment, performing an analysis of the stream to generate a first modified stream having format of the nominal stream and having images modified by substitution of selected data by data of the same nature, but calculated in a random fashion or in relation to an algorithm, and a second stream of any format, including the substituted data and the numerical information capable of allowing reconstruction of the modified stream, separately transmitting, in real time or at different times, two streams thus generated from a server to the destination equipment, and calculating on the destination equipment a synthesis of the stream of nominal format as a function of the first stream and the second stream such that transmission of the second stream is achieved by initializing communication, wherein a user provides identification at the server, which responds to the user who in turn verifies successful communication with the server, and exchanging information between the user and the server in which every message from the user is identified at the server with an identifier of the user sent by the server and every message from the user is identified at the user by an identifier of the server sent by the user.

14 Claims, 2 Drawing Sheets

METHOD FOR SECURED TRANSMISSION OF AUDIOVISUAL FILES

RELATED APPLICATION

This is a continuation of International Application No. PCT/FR2003/002916, with an international filing date of Oct. 3, 2003 (WO 2004/032508, published Apr. 15, 2004), which is based on French Patent Application No. 02/12268, filed Oct. 3, 2002.

FIELD OF THE INVENTION

This invention relates to controlling the processing, broadcasting, transmission, and the secured visualization of audiovisual data and television programs, or more generally any program or multimedia sequence that uses a stream format nominally of type MPEG, by authorized users, and a secured system for processing, broadcasting, delivery, recording, private duplication, and visualization of programs and audiovisual sequences or interactive multimedia.

BACKGROUND

It has been a problem to create a device that is capable of transmitting in a secure manner a set of movies of high visual quality in a numerical format of type MPEG (MPEG-1, MPEG-2, MPEG-4 or the like) or another type based on wavelets, to a screen of a personal computer, a television screen, and/or for being recorded on the hard disk of a box that connects the data communications network to the screen used for visualization, this all while preserving audiovisual quality, but avoiding fraudulent use such as the possibility of making pirate copies of movies or audiovisual programs recorded on the hard disk of a decoder box.

With current solutions it is possible to transmit movies and audiovisual programs in a numerical format via wireless, cable, satellite or the like, broadcasting networks, or via DSL (Digital Subscriber Line) or BLR (boucle locale radio) ("wireless local loop") or DAB (Digital Audio Broadcasting) networks. To prevent pirating of the works broadcasted in this way, the last choices are often encrypted in various ways well known in the art.

However, the principal inconvenience of such current solutions (Tivo Inc., WO00165762) is that one must transmit not only the encrypted data to the users, but also the decryption keys. Transmission of the decryption keys can take place before, at the same time, or after the transmission of the audiovisual programs. To increase the security, and therefore the protection of the audiovisual works against mal-intended use, the decryption keys as well as the decryption methods of the audiovisual decoders can comprise means to improve security, such as chip cards or other physical keys that can, optionally, be updated remotely.

Hence, current solutions applied to a decoder box with the possibility to record locally audiovisual programs in numerical form on whatever type of hard disk or another type of memory, offer a mal-intended user the possibility to make unauthorized copies of the programs thus recorded because, at a given moment, this user possesses with a numerical decoder box, combined or not with systems of chip cards, all the information, the software programs and data to permit complete decryption of the audiovisual programs. As a consequence of such possession of data, the mal-intended user will have the possibility to make illegal copies without anyone detecting this fraudulent copy at the moment that it is made.

A solution therefore consists of transmitting all or part of an audiovisual program in numerical form only on demand (video and program services on demand) over a broadband telecommunication network, for example, of the type fiber optics, ADSL, cable, or satellite, without authorizing local recording of the audiovisual programs. Here, the inconvenience is very different and originates in the performance of these networks which do not guarantee continuous streams of several megabits per second every time used, as is needed for streams of MPEG which require bandwidths of a couple of hundreds of kilobits to several megabits per second.

Under these conditions, a solution is to separate the stream into two parts, each of which alone will not be usable. For example, WO 099908428 (Gilles Maton) discloses a procedure for the multi-purpose treatment of a localizable active terminal within which one establishes at least a link with an identifiable program that is dedicated to the execution of an application, the program dictating its operating conditions to the terminal to make available its functionality. The terminal dialogue punctually, by the use of a link, with the central administration of the establishment of, if necessary, the inputs and outputs of the capacities of the latter, the central administration becoming a slave or not of the terminal on the level of the application vis-à-vis the program input. That invention also concerns the identification procedure of the program and the terminal in use. That procedure divides the stream into a part that serves to identify the user and a part that contains the program properly speaking. In particular, the aforementioned program is not unusable, but only locked by the first party.

EP 0778513 (Matsushita) discloses a procedure for allowing the prevention of the illegal use of information by adding to it control information to verify the rights of the user. The system allows one to know permanently which part of the information is used and by which user, and, through this knowledge, whether the user is in an illegal position or not. That procedure therefore secures the data by combining it with additional information that distorts the initial information.

WO 0049483 (Netquartz) also offers procedures and systems for creating a connection between the users and an editor of the numerical entities. The procedure includes at least one of the following stages: the stage in which the aforementioned numerical entity is divided in two parts; the stage in which one part is stored in an area in memory of the server that is connected to the information network; the stage in which the other part is transmitted to at least a user that has data-processing equipment; the stage in which the aforementioned data-processing equipment is connected to the aforementioned information network; the stage in which a functional link is established between the aforementioned first and the aforementioned second part. Those procedures and systems do not specify whether the part that is stored on the server can be stored by the user, thereby allowing the user to pirate the aforementioned numerical entity.

U.S. Pat. No. 5,937,164 utilizes the solution that consists of separating the stream into two parts of which the smaller contains the information that is necessary for using the larger. However, that patent is not sufficient in addressing the identified problem. In fact, deletion of a part of the stream alters the format of the stream, and is therefore not recognizable as a standard stream that can be used with general application software. That procedure requires at the same time specific software on the server, for the separation of the two parts, and another specific software application which does not only allow the reconstruction of the stream, but also the acquisition of the principal stream and its processing according to a proprietary format of the solution. This proprietary format is not the original format of the stream before it is separated into two parts, in this known solution.

U.S. Pat. No. 5,892,825 goes back to the preceding document, but in a less large framework because the streams are always encrypted. U.S. Pat. No. 6,035,329 is based on the same principle. It concerns a procedure that allows the reading of a disk of type CD-ROM or DVD-ROM conditionally upon the identification of rights by the insertion of a chip card on which the information that is necessary for reading is stored. That procedure is still not sufficient since it does not guarantee that the modified stream has the same format as the original. U.S. Pat. No. 6,185,306 concerns a procedure for transmitting encrypted data from a Web site to a requesting computer. That procedure, however, allows the user to have at a certain moment all the tools necessary for copying the data.

WO 01/97520 discloses methods, procedures, and devices for controlling the transmission and recording of the numerical content of type MPEG-2. However, that publication does not present anything specific for audiovisual documents of type MPEG-4. Moreover, the method is inadequate for small bandwidth telecommunication networks, because it substitutes all or part of the images [here the original French text contains the character 'I' which is untranslatable—Tr.] of which the byte load is very costly during transmission of the second stream.

Finally, "*Cryptographie des télécommunications*" ("Cryptography of telecommunication") by Henri Gilbert and Marc Girault, journal "pour la science" ("For the science"), series July-October 2002, pages 80 to 85, discloses a system to secure a chip card with a dynamical certificate: a chip identifies itself to an access administrator by supplying an identifier and a variable "question" produced by the access administrator. That system guarantees that if an individual clones a chip card with the intention of using it in a fraudulent way, the clone would not be able to identify itself to the access administrator. This system is however limited by its asymmetry.

SUMMARY OF THE INVENTION

This invention relates to a procedure for distributing audiovisual sequences according to a nominal format of a stream including a succession of frames including before transmission to destination equipment, performing an analysis of the stream to generate a first modified stream having format of the nominal stream and having images modified by substitution of selected data by data of the same nature, but calculated in a random fashion or in relation to an algorithm, and a second stream of any format, including the substituted data and the numerical information capable of allowing reconstruction of the modified stream, separately transmitting, in real time or at different times, two streams thus generated from a server to the destination equipment, and calculating on the destination equipment a synthesis of the stream of nominal format as a function of the first stream and the second stream such that transmission of the second stream is achieved by initializing communication, wherein a user provides identification at the server, which responds to the user who in turn verifies successful communication with the server, and exchanging information between the user and the server in which every message from the user is identified at the server with an identifier of the user sent by the server and every message from the user is identified at the user by an identifier of the server sent by the user.

BRIEF DESCRIPTION OF THE DRAWINGS

The invention will be better understood after reading the description of an example that is not limited to the implementation that follows, while referring to the attached drawings where.

DETAILED DESCRIPTION

Figure 1:
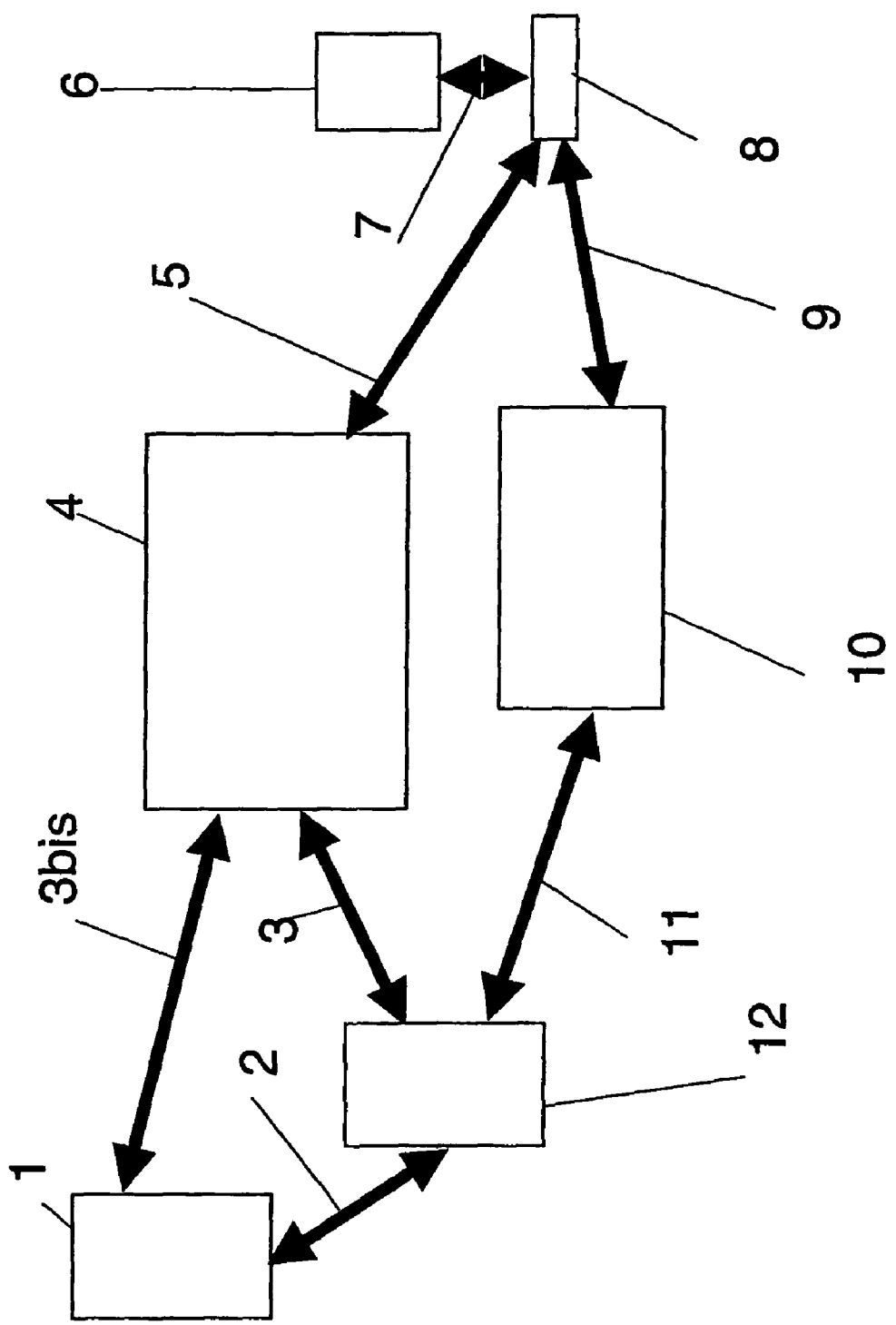
FIG. 1 depicts the overall architecture of a set of systems for implementing the procedure according to aspects of the invention.

This invention concerns a more general procedure for the distribution of audiovisual sequences according to a nominal stream format constituted of a succession of frames, the stream with which one proceeds, before transmission to the client equipment, with an analysis of the stream to generate a first modified stream, having the format of a nominal stream, and having the images that have been modified by substitution of certain data by data of the same kind but that are calculated in a random manner or in relation to an algorithm, and a second stream of whatever format, that comprises the substituted data and the numerical information suitable to allow reconstruction of the aforementioned modified stream, then the transmission separately, in real time or at different times, of the two streams thus generated from the server to the destination equipment, and for which one calculates on the destination equipment a synthesis of the stream with a nominal format as a function of the aforementioned first stream and the aforementioned second stream. In this procedure, the transmission stage of the aforementioned second stage is secured according to the following procedure:

a stage of initializing the communication through which the client identifies itself to the server who responds to the client who in turn verifies that the server communicates well with the client; and a stage of information exchanges between the client and the server where each message from the client side is identified at the server by an identifier of the client sent by the server and every message from the server side is identified by an identifier of the server sent by the client.

According to one aspect, the aforementioned identifier of the client is a random number generated by the server and transmitted by the server to the client, and the identifier of the server is a random number generated by the client and transmitted by the client to the server. Preferably, the server generates a new random number for every message dispatched, the aforementioned random number thus being an identifier of the response of the server. Advantageously, the client equipment comprises a chip card reader and the aforementioned synthesis is realized in part on an electronic chip that is linked to the client equipment by the aforementioned reader. The aforementioned electronic chip may prohibit the continuation of the aforementioned synthesis. Advantageously, the chip utilizes a random number that is associated with every message of the client equipment to identify the response of the server's aforementioned message and to prohibit the said continuation of the synthesis.

According to a particular aspect of the invention, all communication between the client equipment and the server is encrypted. Advantageously, the aforementioned encryption is an encryption with public and private keys that utilizes the identifier of the client at the server. Preferably, the client identifies itself at the server thanks to reference data that concern the serial number of the equipment, the identifier of the chip card, and the identifier of the network of the client.

In a particular aspect of the invention, the chip card and the synthesis device included in the client equipment communicate through a connection that is secured in the same manner as the connection between the aforementioned server and the aforementioned client: every message from the aforementioned synthesis device is identified by the chip card by an identifier of the synthesis device sent by the chip card and every message from the chip card is identified by the synthesis device by an identifier of the chip sent by the synthesis device. Advantageously, a part of the synthesis process of the original stream is realized on the chip card.

A description of the general functionality of the communication between the server and the client is depicted hereinafter by reference to FIGS. 1 and 2.

The invention concerns a stream of data of a nominal format, notably, but not exclusively, a stream of type MPEG (MPEG-1, MPEG-2, MPEG-4). The general principle of a procedure to secure an audiovisual stream is stated below. The objective is to authorize video services on demand and pick and pay across all these broadcasting networks and the local storage in the numerical decoder box of the user. The solution comprises permanently keeping outside the dwelling of the user, in fact inside the broadcasting network, a part of the recorded audiovisual program, this part being essential for visualization of the aforementioned audiovisual program on a television screen or a type of monitor, but being of very small volume compared to the volume of the total of the numerical audiovisual program that is recorded by the user. The missing part will be transmitted via the broadcasting network at the time of the visualization of the aforementioned numerical audiovisual program that is pre-recorded by the user.

The larger part of the audiovisual stream is thus transmitted via a conventional broadcasting network while the missing part is dispatched on demand via a narrowband telecommunication network like the conventional telephone networks or cellular networks of type GSM, GPRS, or UMTS, or by using a small part of a network of type DSL or BLR, or also by using subset of the truncated bandwidth of a cable network.

Figure 2:
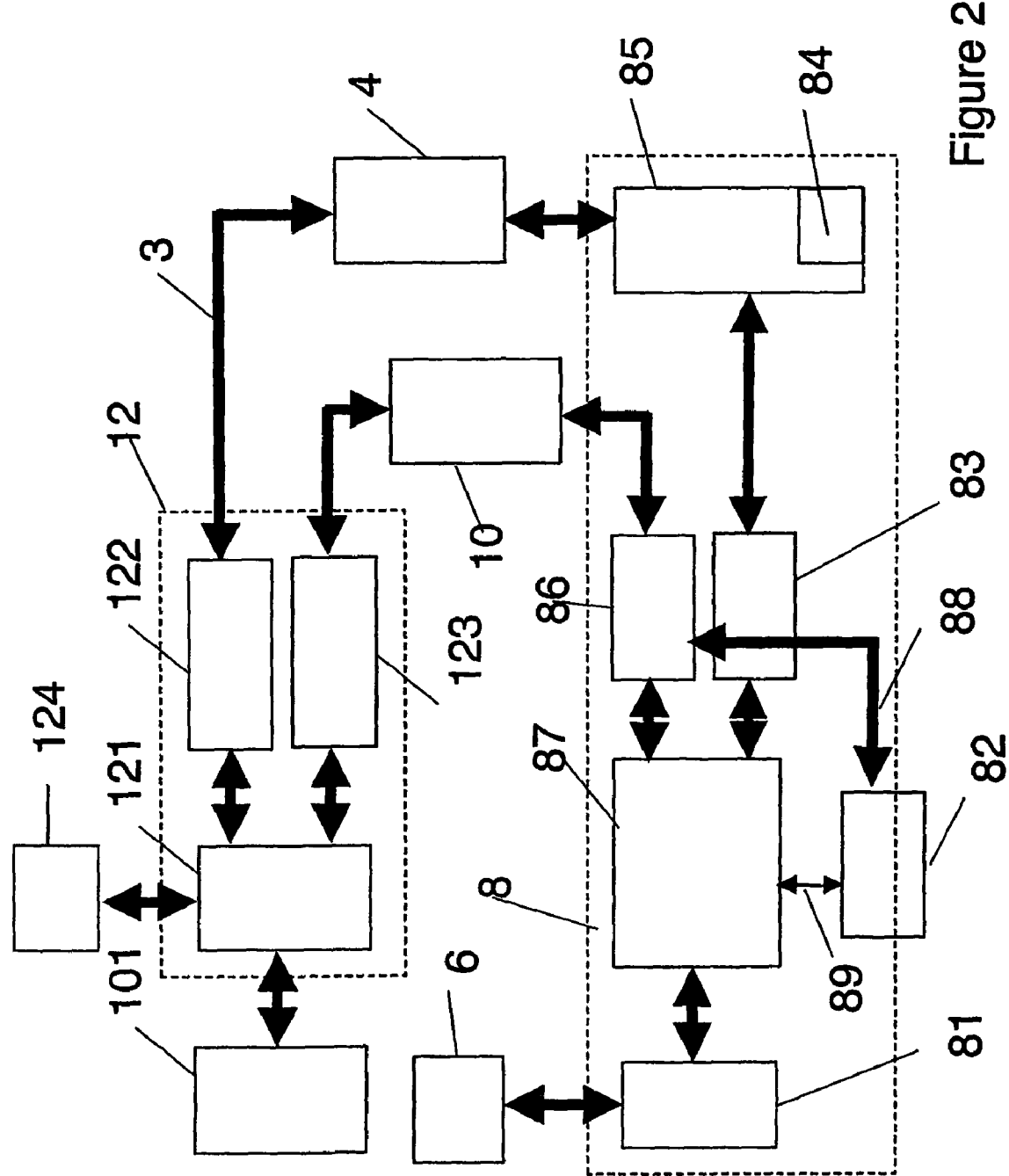
FIG. 2 represents a particular implementation of the analysis system and the synthesis of the stream of type MPEG in accordance with aspects of the invention.

In FIG. 1, organization of the audiovisual interface (8) is adapted to connect at least to a display device, for example, a monitor, a video projector, or a device such as a television screen (6), with at least a data communications network and broadband broadcasting (4) interface and with at least a telecommunication network (10) interface. This organization comprises a module (8) which comprises mainly, on the one hand, a processing unit that is adapted to control, in particular, to decode and descramble all audiovisual streams of type MPEG according to preloaded decoding and descrambling software, the display method, in real time or at different times, the storing, the recording and/or the dispatching to a telecommunication network, and, on the other hand, at least a screen interface (7) and a connection interface to a local area network or a wide area (5) network and/or (9). The transmission and broadband broadcasting (4) network and the telecommunication network (10) could be merged into one single network.

The hard disk of module (8) could be used as a buffer to store momentarily at least a part of the program or the audiovisual sequence which is to be displayed, in case of different visualizations or a limitation due to the bandwidth of the data communications network. The visualization can be delayed or different on demand of the user or the portal (12).

As FIG. 1 shows, the interface of connection (5) is connected to a transmission and broadband broadcasting (4) network by a device such as a modem, a satellite modem, a cable modem, to an interface of fiber optics cables or a radio or infrared interface for wireless communication.

It is through this conventional audiovisual broadcasting connection that the contents of audiovisual programs such as movies will be transmitted. However, so as not to let pirated copies to be made, before transmitting the audiovisual content from the server (1) or the portal (12), it is possible to keep a small part of the audiovisual content in the portal (12). In the case of visualization of an audiovisual program in real time, this small part of the audiovisual content kept in the portal (12) is dispatched to module (8) via the telecommunication network (10).

As FIG. 1 shows, the connection interface (9) is linked to a wide area telecommunications network (10), directly or by a local area network that serves as an access point to the network and that consists of, for example, an interface of a subscriber line (The analog telephone network, DSL, BLR, GSM, GPRS, UMTS and the like).

Therefore, the audiovisual programs are dispatched in the conventional way by multi-diffusion ("broadcast") via the broadband data communications network (4) of type wireless, cable, satellite, digital wireless, DSL and the like, from the server (1) directly via the connection (3bis) or via the portal (12) via the connection (2) and (3) to the decoder module (8) across connection (5). Every audiovisual program broadcasted this way can be encrypted or not, and, consistent with this invention, the streams of type MPEG comprise modifications at the level of certain images as described below. Dependent upon the parameters chosen by the user or the information transmitted by the broadcasting server, certain audiovisual programs modified and incomplete in this manner, are recorded on the hard disk of box (8).

When the user desires to watch an audiovisual program that is recorded in this manner on the hard disk of box (8), the user makes a request in a conventional way with a remote control connected to box (8) which then automatically connects itself to the portal (12) via the connection (9) of type local area or direct access network and across the telecommunication network (10) that is itself connected to portal (12) via connection (11). Throughout the visualization of the audiovisual program the connections (9) and (11) remain established, allowing the box (8) to receive the functions and the parameters for the reconstruction of the modified stream or the modified images. The functions and the parameters for the reconstruction of the modified stream or the transmitted modified images are not recorded on the hard disk of the box (8) because the images of the reconstructed audiovisual stream are directly displayed on the display device (6) via connection (7) after having been processed by the reader of the box (8) starting with its local volatile memory. Once processed and displayed, the functions and the parameters for reconstruction of the modified stream or of the modified images that just have been transmitted by the portal (12) are erased from the local volatile memory of the box (8).

The box (8) may comprise a chip card reader that will allow the portal (12) to authenticate the user that owns the box (8). For data with MPEG content, the chip card may contain the aforementioned second stream that has been memorized by the portal (12). If this is authorized, the chip card allows the user to also create private copies of the audiovisual programs that are recorded on the hard disk of the decoder box (8). To achieve this, if the user wants to make a private copy of an audiovisual program, the user will make it in a conventional way on a video cassette recorder via connection (7) that links the box (8) the display screen (6).

However, if the user desires to keep a private copy on the hard disk of the device, the user indicates this to device (8) which records the information "private copy" as well as the coordinates of the user that are located on the chip card, in a particular field (84) of this audiovisual program that is recorded on the hard disk (85) of the decoder box (8). Afterwards, every time that the user wants to watch this private copy, the box (8) connects itself automatically to the portal (12) and indicates to the last that the user wants to make a reading of the private copy. In return, if the reading of the private copy is possible for this user that possesses this chip card linked to this box (8), the decoder box (8) receives then modified information and/or missing parts of the first stream as well as all the other parameters that permit visualization of the audiovisual program that the copy constitutes.

The invention concerns equally the physical device (8) that is utilized by the consumer to access the data. This physical device is situated in the dwelling of the user. It provides a set of functionalities that manage the appropriate information to present according to the selection of the audience and manage the connection and the communication with the distant server.

The physical device corresponding to an organization of audiovisual interfacing (8) may be implemented as an autonomous device equipped with an integrated hard disk. The physical device corresponding to an organization of audiovisual interfacing (8) may also be implemented as an autonomous portable device (mobile) with an integrated hard disk and/or disks reader (CD, DVD, etc.). The autonomous physical device (8) may comprise a chip card reader.

Organization of the audiovisual interfacing (8) may be implemented as an additional card that is installed in a computer of type PC and that at least is connected to an interface of a data communications and broadband broadcasting network (4) and at least to an interface of a telecommunications network (10). This card uses the hard disk of the PC computer to record the first stream, but comprises its own calculator and its own volatile memory so as not to make available to the mal-intended user of the PC the means to access complementary information such as the functions and the parameters for reconstructing the modified stream or the modified images of the second stream.

The audiovisual and multimedia servers (1) and/or (12) comprise the means of the encoding, the code conversion and the scrambling of the audiovisual data, in particular the means to add cryptographic information and the security at the beginning and throughout the sequences.

It is finally left to note that the invention degrades the MPEG stream from the visual point of view to a degree that recognition of the transmitted and displayed scenes is no longer possible without having access to data and complementary characteristics, but completely reconstructs the MPEG stream in the organization of the audiovisual interfacing (8) without any loss.

Although this invention should be centered in particular around audiovisual data, it is understood that all interactive multimedia information and all interactive data can be processed by the organization and the system, the audiovisual data of type MPEG being the more elaborate. The invention will be understood better with the help of the following description that presents the physical base of the invention and by reference to FIG. 2 of a design in the appendix that represents one aspect as a nonrestrictive example of an implementation that is particularly well adapted to cable and satellite networks.

Modification of the MPEG stream is described by way of example and it can take other forms. However, for an effective implementation of the invention, it is appropriate that the part that is used to reconstruct the initial stream is of very small size compared to the total stream to allow its deliverance. In addition, the first stream, generated by the analysis device (121), is an MPEG stream in a way that the user could display it without appreciating the contents of the stream because of the degradation induced by the analysis.

The other part of the modified MPEG stream may be stored in the buffer (123) of the portal (12). For every MPEG stream thus dispatched, the portal (12) conserves in a buffer (123) the modifications that have been added to the MPEG stream by the analyzer (121) of the portal (12). It is specified that, for a like MPEG input stream (101) the processing of the stream can be different for every user (8) and/or for every group of users (8). Thus, the buffer (123) of the portal (12) comprises a different area in memory for every user.

The phase described below corresponds to the first phase of the preparation of the MPEG stream by the portal (12), to its transmission via the broadband network (4) and to its recording in a decoder (8). This decoder can then display this MPEG stream that is recorded on its hard disk (85). For this, the synthesis system (87) of the decoder (8) reads the MPEG file from its hard disk (85) and dispatches it to a conventional MPEG reader (81). If any complementary data are not received by the synthesis system (87) then the MPEG stream that arrives at the reader (81) is processed and displayed as such, which causes an important distortion of the display on the screen of visualization (6). On the other hand, since the recorded stream is indeed of type MPEG, the reader (81) does not make a difference and displays the information, that appears well as data of an MPEG video stream but that is completely incoherent to the human being that watches the screen (6), on the output screen (6). Any copy of the MPEG stream coming from the hard disk (85) of the box (8) will produce the same visual effect at the time of its restitution by whatever MPEG reader; all utilization of this copy that will be mal-intended is thus doomed to failure.

In a particular arrangement, the device (8) comprises a cellular link to a GSM network (10).

In the device described below, the invention concerns more particularly the way to secure the connection between the client equipment and the server. In fact, a mal-intended person can connect to the communication channel between the client and the server and, with the appropriate algorithm, reconstruct the original stream.

For that, the invention brings into play two mechanisms:
an encryption mechanism for the communication data with parameters only known to the server;
a data decryption mechanism for the client equipment on a chip card, the aforementioned decryption being preliminary to the whole reconstruction of the original stream.

These two mechanisms allow at the same time verification of the identity of the client at every request to the server, and non-storage of the information dispatched by the server. For this last point, if the user stores the data dispatched by the server for later use, the user will not be able to accomplish the decrypting operation in the chip card that uses the data relative to the date of the data.

The invention will be better understood upon reading the description of a way of implementing the invention.

A first stage comprises initializing connection between the client and the server. For this, because the program executed on the client needs the complementary information to reconstruct the original stream, the client automatically calls the server while supplying the references to the audiovisual file that the client wants to display. The client also transmits to the server the serial number of the equipment ("Set Top Box" or card integrated with a computer) and the identifier of the chip card. A "Set Top Box" is a device that interconnects with a display device such as a television, for example, and that allows the display of audiovisual content. The client also supplies the server with its address on the network, this address could be the number of the physical telecommunication line (ADSL, BLR, Cable or the like).

To start up the process, the chip card of the client dispatches a random number Ni, the beginning of the calculation of which depends on a support function on a touch key of the remote control (the key "read" of preference) and the time. Thus, it is certain that the number Ni is completely random because the time at which the key is pressed is unpredictable.

The serial number of the equipment, the identifier of the chip card, the number Ni, and the identifier of the network of the client constitute the reference data of the client at the server. The last utilizes the reference data of the client to determine if the aforementioned client is authorized to read the original stream. For this, in a particular aspect of the invention, the server is connected to a database that comprises the reference data of all the clients and audiovisual contents that every client has the right to obtain.

If the client is authorized to download the missing part of the stream, then the server prepares a response by:

choosing a random number Ns that is a function of Ni and the time of arrival of the message of the client;

dispatching a message that contains the number Ns encrypted with the number Ni, the reference data of the client, and a public key of the client.

The server responds on the physical line that corresponds to the number that it has in memory, but does not respond on the telecommunication line that was used by the client to contact the server. This conventional method prevents pirate attacks.

The random number Ns generated by the server is afterwards in turn used by the client to respond to the server, and allows the server to control the source of each request that comes in.

The client receives the response and decrypts it with a private key in the manner of PGP ("Pretty Good Privacy," a public key encryption algorithm), its reference data, and the number Ni. This decryption is in part carried out in the chip card (a part of the program is located and is executed inside the chip card).

If the decryption is valid, the client generates a new random number Nc calculated as a function of the arrival time of the message of the server and responds to the server by encrypting its response with the public key of the server, the reference data of the client, the random number Ns just received from the server; the client also indicates in its message the references of the aforementioned $1^{st}$ stream and the temporary position it is in, in the decryption process.

Once this initialization stage is complete, the client and the server converse to allow decryption of the audiovisual content as it carries on reading. This secured dialogue cycle is described below.

The server receives the encrypted data sent by the client and decrypts it with its private key and the reference data of the client, the last random number Ns that the client sent, and the time and the date of the client.

The decrypting permits the server to identify the request as one coming from an anticipated client (thanks to the reference data) and in response to the last message of the server (thanks to the random number Ns). Moreover, the server decrypts the last random number Nc generated by the client. If the verification is successful, the server dispatches to the client the data of the aforementioned second stream expected by the client. Moreover, a new random number Ns is generated that is calculated as a function of the arrival of the last message of the client.

The server then constructs a message in which the data of the second stream and the new number Ns are encrypted with the public key of the client, the reference data of the client, and the last random number Nc generated by the client and received by the server.

The response of the server takes place on a physical line that corresponds to the number that it has in memory, but it does not respond on a telecommunication line that was used by the client to contact the server.

The client receives the response of the server and decrypts it using a private key, the last random number Nc dispatched to the server, and the reference data of the clients.

The client reconstructs the original stream with the aforementioned first stream previously loaded and the part of the second stream that the client is decrypting. For this, at least a part of the combination of the aforementioned first and second stream is executed in the chip card in a way that it is not possible for a mal-intended user (a pirate) to reproduce all or part of the original stream. This part can be verification of the random number Nc or execution of certain instructions that permit recombination of the aforementioned streams to reconstruct coherent audio-visual signals.

Termination of the decrypting procedure of the client can be decided by the client (the chip card detects incoherencies) or by the server who stops dispatching data to the client. Termination of the procedure can be effected by the non-execution of programs in the chip card. The decision to terminate the procedure can be decided by the chip card, maybe because the dialogue between the server and the client presented incoherencies or did not exist (because of a disconnection of the line of telecommunication between the client and the server), maybe because the dialogue between the server and the client give rise to incoherencies at the level of transactions (for example, at the level of the random numbers Nc and Ns). In case the chip card terminates the procedure, the execution of programs in the client processor will be disturbed because a part of the processing (co-processing) that must be executed in the chip card will no longer take place.

The client next generates a new message to request the aforementioned sequence of the second stream, encrypting this message with the public key of the server, the reference data of the client, and the random number Ns that the client just received from the server. The client includes in the message a new random number Nc generated as a function of the arrival time of the last message of the server and the client indicates again in a message the references of the aforementioned first stream and the temporary position the client is in while decrypting.

If the client terminates the reading of the multimedia content (by pressing the key "Pause," for example), the process is again initialized and resumes its initialization phase when the user again presses the key previously cited ("Read," for example). Optionally, the stage of identification of the client at the server is not realized and the cycle begins with a request for audiovisual content together with a random number generated as a function of the moment the key is pressed.

According to one aspect of the invention, illustrated in FIG. 2, the multimedia content is broadcasted as follows.

During the preparatory phase, the MPEG stream (101) is analyzed by the analysis device (121) to generate two streams, the first stream being of the same nature as an MPEG stream and broadcasted by the output (122) and the second stream that comprises information that allows reconstruction of the original stream. The first stream is transmitted to the client through the communication channel (4) that can be a broadband communications network or a physical device (CD), for example. The first stream is stored on a device (85) connected to the client equipment (a hard disk or a CD, for example).

The second stream is stored in a buffer (123) on the server. It is transmitted over a communication channel (10) on request of the client. The client receives the second stream through the input buffer (86).

During reception of the second stream, the synthesis device (87) receives the first stream through a read buffer (83) and uses the two streams to reconstruct the initial stream. The synthesis device (87) is controlled by the chip located on the chip card (82). For this, the data that arrive in the input buffer (86) are transmitted to the chip card (82) through the connection (88). The communication of the second stream comprises a initialization phase and a phase of dialogue.

During the initialization phase, the client equipment (8) sends the portal server (12) its reference data, the identifier of the requested sequence, the temporary position in the aforementioned sequence, and a random number Ni calculated by the chip card (82) as a function of the instant that the user presses the key "Read" on the remote control of his equipment;

the server (12) compares the reference data of the client with the data stored in a database (124) connected to the server (12); it also records the random number Ni;

if the client has the right to preview the requested sequence, the server (12) generates a random number Ns1 as a function of the arrival time of the message of the client and encrypts this number with the public key of the client, the reference data of the client and the number Ni;

the client (8) receives the message of the server (12) and processes it with the chip card (82), that decrypts the random number Ns1 with the private key of the client, its reference data, and the number Ni;

if decrypting is successful, that means that the client-server dialogue functioned correctly because the number Ni transmitted by the server (12) is the same as the last number Ni generated by the chip card (82); the client thus takes into account the number Ns1 dispatched by the server;

the chip card (82) of the user (8) generates a new random number Nc1 calculated from the time of arrival of the message of the server and encrypts this number with the number Ns1 that it has decrypted, the public key of the server, and the reference data of the client. The message formed in this way is dispatched to the server (12);

the server (12) decrypts the message of the client and verifies that the Ns1 dispatched by the client corresponds to the Ns1 that the client has generated. If this not the case, the server interrupts the transmission of the audiovisual content. If it is the case, the process enters a loop described below that can be interrupted by the client and/or the server.

The loop dialogue between the client and the server is described hereafter:

the server (12) generates a message that comprises the part of the second stream that the client waits for, the number Nc1 that he has decrypted and a new random number Nsi+1 calculated as a function of the time of the arrival of the last message of the client. This message is encrypted with the public key of the client, the reference data of the client, and the random number Nci that the server has decrypted in the last message of the client;

the client receives the message, the chip card (82) decrypts the message and verifies the value of Nci in the same fashion as in the case of the number Ni described above. If the verification is positive, the chip (82) authorizes the synthesis device (87) to process the data of the second stream to reconstruct the original stream. The chip (82) also decrypts the number Nsi+1 and stores it for the emission of the next message;

the chip (82) generates a new random number Nci+1 and the client (8) encrypts a message that contains the number Nci+1, the data of the second stream required by the synthesis device (87) that are encrypted with the public key of the server, the reference data of the client, and the number Nsi+1. This message is dispatched to the server (12);

the server (12) receives the message of the client and decrypts it with its private key, the reference data of the client, and the number Nsi+1. If the decrypting is successful, the number Nsi+1 is then correct and the process is authorized to continue.

The process may comprise in addition a stage of securing the communication between the chip card that is integrated with the equipment of the client and the reader module ("Reader"), and is executed by a processor (86) that is connected to the chip card through an internal link (88).

For that, a part of the program that reconstructs the original stream from the aforementioned two streams is carried out on the chip card. For that, the "Reader" (87) and the chip card are connected by link (89). The calculations are carried out by the chip as long as the chip card communicates with the distant server (12). Thus, if a verification of the random numbers Nci, generated and verified by the chip fails, the chip interrupts the communication with the server (12). The interruption of this communication sets in motion the interruption of the process of reconstruction of the streams by the chip, and the reconstruction of the aforementioned two streams is therefore not realized because the co-process that must execute the chip card (82) does not take place and because the data expected by module (86) and the reader (87), via connections (89) and (88), will not be transmitted by the chip (82).

Moreover, the module (86) and the chip (82) on the one hand and the "Reader" (87) and the chip (82) on the other hand, communicate over a secured connection (89) and (88) in the same way as the connection between the server (12) and the client (8).

With every message, the chip generates a random number Ncp calculated as a function of the arrival time of the last message coming from the "Reader" (87) and dispatches a message that contains information about the processing of the stream and the last random number Ncp, both these two pieces of information are encrypted with the public key of the "Reader," the aforementioned reference data, known from the chip and the "Reader," and the last random number N1 received from the "Reader." When the next message comes from the "Reader," the chip decrypts the message with its private key, the reference data, and the last number Ncp that it sent. When the decrypting is successful, the chip maintains the communication with the "Reader." If the decryption fails the chip interrupts the communication. In a particular implementation, if the decrypting fails, the chip again requests the message from the "Reader" one or more times before interrupting the communication.

Together with every message, the "Reader" generates a random number N1 calculated as a function of the arrival time of the last message comes from the chip card and dispatches a message that contains information concerning the processing of the streams and the last random number N1, these two pieces of information being encrypted with the public key of the chip card, the aforementioned reference data, known by the chip and the "Reader," and the last random number Ncp received by the chip card. When the next message coming from the chip card, the "Reader" decrypts the message with its private key, the reference data, and the last number N1 that it has sent. When the decrypting is successful, the "Reader" maintains the communication with the chip. If the decryption fails the "Reader" interrupts the communication. In a particular implementation, if the decrypting fails, the "Reader" again requests the message from the chip one or more times before interrupting the communication.

The invention claimed is:

1. A procedure for distributing audiovisual sequences according to a nominal format of a stream comprising a succession of frames, comprising:
 before transmission to client equipment, analyzing the stream to generate a first stream, having the nominal format of the stream, and having images modified by substitution of selected data with replacement data, and to generate at least one second stream of any format, comprising substituted data and numerical information capable of allowing reconstruction of the stream, wherein visual reproduction of the succession of frames from the first stream absent using the at least one second stream is frustrated; and
 transmitting separately the first stream and the at least one second stream from at least one server to the client equipment for calculation of a synthesis of the stream of nominal format as a function of the first stream and the at least one second stream,
 wherein the transmission of the at least one second stream is secured by:
  initialization of communication in which the at least one server receives an identification from the client equipment and verification from the client equipment of successful server communication; and
  in which a message received from the client equipment is identified at the at least one server with an identifier of the client equipment previously transmitted by the at least one server to the client equipment, and a message transmitted from the at least one server includes an identifier of the at least one server previously received from the client equipment by the at least one server.

2. The procedure according to claim 1, wherein the identifier of the client equipment is a random number generated by the at least one server and transmitted by the at least one server to the client equipment, and wherein the identifier of the at least one server is a random number generated by the client equipment and received from the client equipment by the at least one server.

3. The procedure according to claim 2, further comprising the at least one server generating a new random number for a message dispatched, the random number then being equally an identifier of the response of the client equipment.

4. The procedure according to claim 1, further comprising encrypting communications between the client equipment and the at least one server.

5. The procedure according to the claim 4, wherein the encrypting includes encrypting with public and private keys utilizing the identifier of the client equipment at the at least one server.

6. The procedure according to claim 1, further comprising the at least one server receiving identification from the client equipment, the identification including reference data concerning serial number of the client equipment, an identifier of a chip card, and an identifier of a network of the client.

7. A procedure for distributing audiovisual sequences according to a nominal format of a stream comprising a succession of frames, comprising:
 before transmission to destination equipment, performing an analysis of the stream to generate a first stream having the nominal format of the stream and having images modified by substitution of replacement data, the first stream being calculated in a random fashion or in relation to an algorithm, and to generate at least one second stream of any format, comprising substituted data and the numerical information capable of allowing reconstruction of the stream, wherein visual reproduction of the succession of frames from the first stream absent using the at least one second stream is frustrated, and
 separately transmitting, in real time or at different times, the first stream and the at least one second stream from at least one server to the destination equipment for calculation of a synthesis of the stream of nominal format as a function of the first stream and the at least one second stream such that transmission of the at least one second stream occurs by:
  initializing communication wherein the at least one server receives identification of the destination equipment that verifies successful communication with the at least one server,
  in which a message received from the destination equipment is identified at the at least one server with an identifier of the destination equipment sent by the at least one server and a message transmitted from the at least one server includes an identifier of the at least one server received from the destination equipment.

8. An apparatus for distributing audiovisual sequences according to a nominal format of a stream comprising a succession of frames, comprising:
 means for performing, before transmission to destination equipment, an analysis of the stream to generate a first stream having a format of the nominal stream and having images modified by substitution of selected data with data of the same nature, and to generate at least one second stream of any format, comprising the substituted data and the numerical information capable of allowing reconstruction of the stream, and for transmitting the first stream and the at least one second stream to the destination equipment, and
 means for storing at least one of the first stream and at least one second stream, wherein visual reproduction of the succession of frames from the first stream absent using the at least one second stream is frustrated, and
 wherein a synthesis of the stream of nominal format as a function of the first stream and the at least one second stream is calculated on the destination equipment, such that transmission of the at least one second stream occurs by:
  initializing communication wherein the at least one server receives identification of the destination equipment that verifies successful communication with the at least one server,
  in which a message received from the destination equipment is identified at the at least one server with an identifier of the destination equipment sent by the at least one server and a message transmitted from the at least one server includes an identifier of the at least one server received from the destination equipment.

9. A system for distributing audiovisual sequences according to a nominal format of a stream comprising a succession of frames, comprising:

at least one server configured to perform, before transmission to client equipment, an analysis of the stream to generate a first stream having the nominal format of the stream and having images modified by substitution of replacement data, and to generate at least one second stream of any format, comprising substituted data and the numerical information capable of allowing reconstruction of the stream, the at least one server to separately transmit the first stream and the at least one second stream to the destination equipment, wherein visual reproduction of the succession of frames from the first stream absent using the at least one second stream is frustrated; and client equipment configured to calculate a synthesis of the stream of nominal format as a function of the first stream and the at least one second stream, such that transmission of the at least one second stream occurs by initializing communication wherein the at least one server receives identification of the client equipment that verifies successful communication with the at least one server, and in which a message received from the client equipment is identified at the at least one server with an identifier of the client equipment sent by the at least one server and a message transmitted from the at least one server is identified at the client equipment by an identifier of the at least one server sent by the client equipment.

10. The system according to claim 9, wherein the client equipment comprises a chip card reader, and wherein the client equipment is configured to realize the synthesis in part on an electronic chip connected to the client equipment by the chip card reader.

11. The system according to claim 10, wherein the electronic chip is configured to prohibit the synthesis.

12. The system according to claim 10, wherein the chip card reader is configured to use a random number that is associated with a message of the client equipment to identify a response of the at least one server to the message and to prohibit a proceeding of the synthesis.

13. The system according to claim 10, further comprising a synthesis device included in the client equipment, and wherein the chip card reader and the synthesis device are configured to communicate over a connection that is secured, such that a message on the part of the synthesis device is identified at the chip card reader by an identifier of the synthesis device sent by the chip card reader, and a message on part of the chip card reader is identified at the synthesis device by an identifier of the chip card reader sent by the synthesis device.

14. The procedure according to claim 2, further comprising the client equipment generating a new random number for a message dispatched, the random number then being equally an identifier of the response of the at least one server.

* * * * *